(12) United States Patent
Singh et al.

(10) Patent No.: US 12,676,788 B2
(45) Date of Patent: Jul. 7, 2026

(54) SYSTEM AND METHOD FOR INTEGRATING OBSERVER CAPABILITY WITHOUT LATENCY VIA DYNAMIC APPLICATION OF CUTOMIZABLE EVENT TEMPLATES AND CENTRALIZED VALIDATIONS

(71) Applicant: JPMorgan Chase Bank, N.A., New York, NY (US)

(72) Inventors: Shailesh Singh, Frisco, TX (US); Amalesh Pradhan, Plano, TX (US); Katlen Garcia, Frisco, TX (US); Peterson Normil, Tampa, FL (US); Nathan Bianco, Longview, TX (US); Meenu Lakshmi, The Colony, TX (US); Lane Macdougall, Keller, TX (US); Anthony Nguyen, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 146 days.

(21) Appl. No.: 18/814,079

(22) Filed: Aug. 23, 2024

(65) Prior Publication Data

US 2026/0058869 A1 Feb. 26, 2026

(51) Int. Cl.
*G06F 15/173* (2006.01)
*G06F 9/54* (2006.01)

*H04L 41/069* (2022.01)
*H04L 41/16* (2022.01)

(52) U.S. Cl.
CPC ............ *H04L 41/069* (2013.01); *G06F 9/542* (2013.01); *H04L 41/16* (2013.01)

(58) Field of Classification Search
CPC ........ H04L 41/069; H04L 41/16; G06F 9/542
See application file for complete search history.

(56) References Cited

U.S. PATENT DOCUMENTS

| | | | |
|---|---|---|---|
| 12,271,847 B2 * | 4/2025 | Tremblay | G06Q 10/0633 |
| 2021/0073026 A1 * | 3/2021 | Myers | G06F 11/3065 |
| 2022/0343250 A1 * | 10/2022 | Tremblay | G06F 3/0482 |

\* cited by examiner

*Primary Examiner* — John B Walsh
(74) *Attorney, Agent, or Firm* — Greenblum & Bernstein, P.L.C.

(57) ABSTRACT

Various methods and processes, apparatuses or systems, and media for performing dynamic observations of inter-domain event processing in real-time are disclosed. The present disclosure provides receiving an inter-domain event; transmitting, to an event streaming platform, the inter-domain event as a data stream; extracting a topic for the serialized inter-domain event; and identifying, at an observer application, a workflow corresponding to the identified topic. The present disclosure further provides applying an event template corresponding to the deserialized inter-domain event, and based on the event template applied, dynamically applying a corresponding rule set without first requiring storage of the inter-domain event as a data object for capturing attributes corresponding to the inter-domain event on the fly.

20 Claims, 11 Drawing Sheets

Figure 8B:
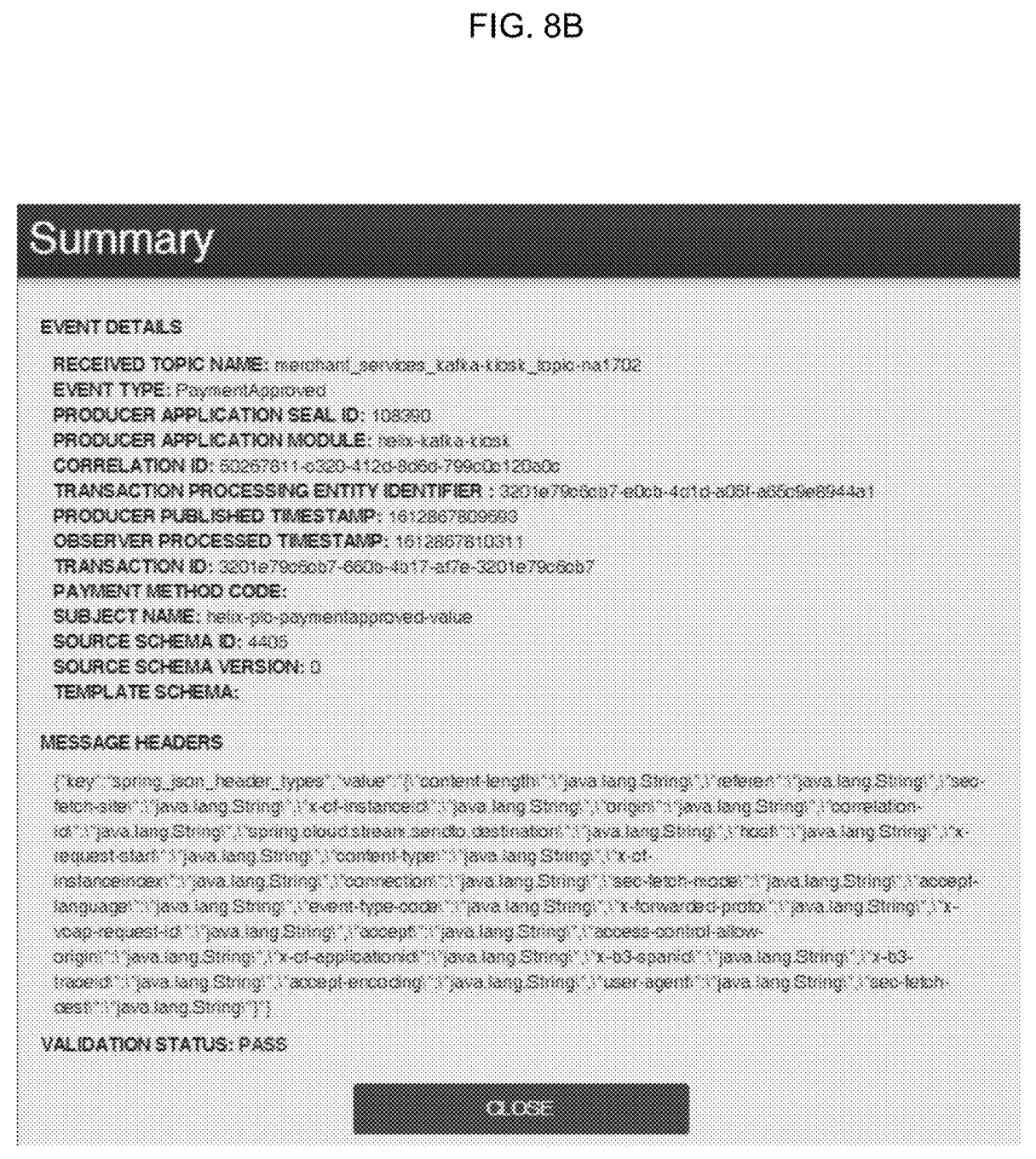

Summary

EVENT DETAILS

RECEIVED TOPIC NAME: merchant_services_kafka-kiosk_topic-na1702
EVENT TYPE: PaymentApproved
PRODUCER APPLICATION SEAL ID: 108390
PRODUCER APPLICATION MODULE: helix-kafka-kiosk
CORRELATION ID: 50257611-c320-412d-8d6d-799c0c120a0c
TRANSACTION PROCESSING ENTITY IDENTIFIER : 3201e79c6cb7-e0cb-4c1d-a38f-a35c9e6544a1
PRODUCER PUBLISHED TIMESTAMP: 1612867809680
OBSERVER PROCESSED TIMESTAMP: 1612867810311
TRANSACTION ID: 3201e79c6cb7-660b-4b17-af7e-3201e79c6cb7
PAYMENT METHOD CODE:
SUBJECT NAME: helix-pc-paymentapproved-value
SOURCE SCHEMA ID: 4405
SOURCE SCHEMA VERSION: 0
TEMPLATE SCHEMA:

MESSAGE HEADERS

{"key":"spring_json_header_types","value":"{"content-length":"java.lang.String","referer":"java.lang.String","sec-fetch-site":"java.lang.String","x-cf-instanceid":"java.lang.String","origin":"java.lang.String","correlation-id":"java.lang.String","spring_cloud.stream.sendto.destination":"java.lang.String","host":"java.lang.String","x-request-start":"java.lang.String","content-type":"java.lang.String","x-cf-instanceindex":"java.lang.String","connection":"java.lang.String","sec-fetch-mode":"java.lang.String","accept-language":"java.lang.String","event-type-code":"java.lang.String","x-forwarded-proto":"java.lang.String","x-icap-request-id":"java.lang.String","accept":"java.lang.String","access-control-allow-origin":"java.lang.String","x-cf-applicationid":"java.lang.String","x-b3-spanid":"java.lang.String","x-b3-traceid":"java.lang.String","accept-encoding":"java.lang.String","user-agent":"java.lang.String","sec-fetch-dest":"java.lang.String"}"}

VALIDATION STATUS: PASS

CLOSE

FIG. 8C

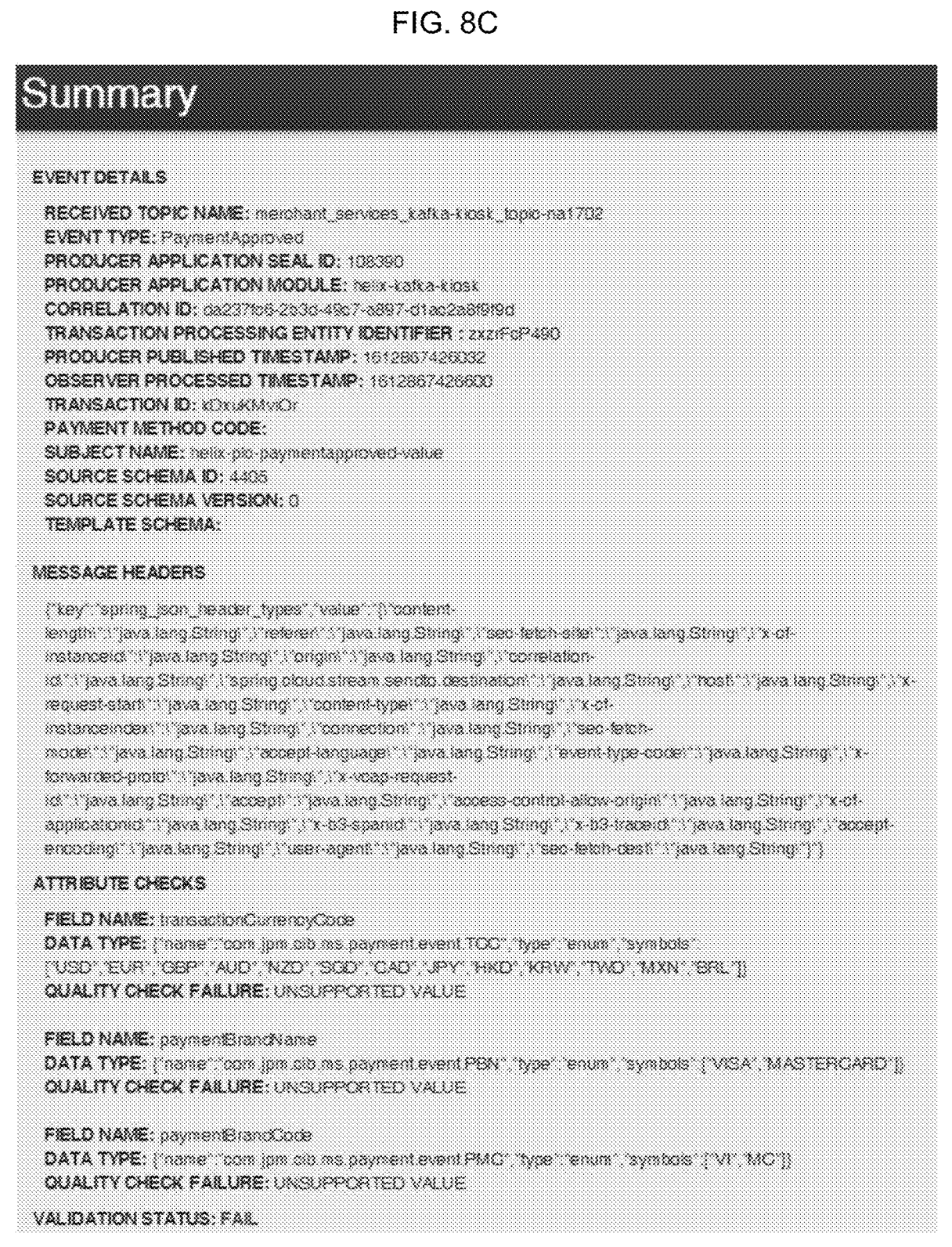

Summary

EVENT DETAILS

RECEIVED TOPIC NAME: merchant_services_kafka-kiosk_topic-na1702
EVENT TYPE: PaymentApproved
PRODUCER APPLICATION SEAL ID: 108090
PRODUCER APPLICATION MODULE: helix-kafka-kiosk
CORRELATION ID: 0a237fe6-2a3d-49c7-a897-d1ac2a8f9f9d
TRANSACTION PROCESSING ENTITY IDENTIFIER : zxzrFdP480
PRODUCER PUBLISHED TIMESTAMP: 16128674280032
OBSERVER PROCESSED TIMESTAMP: 16128674286000
TRANSACTION ID: IDxuKMviOr
PAYMENT METHOD CODE:
SUBJECT NAME: helix-plc-paymentapproved-value
SOURCE SCHEMA ID: 4405
SOURCE SCHEMA VERSION: 0
TEMPLATE SCHEMA:

MESSAGE HEADERS

{"key":"spring_json_header_types","value":"{\"content-
length\":\"java.lang.String\",\"referer\":\"java.lang.String\",\"sec-fetch-site\":\"java.lang.String\",\"x-of-
instanceid\":\"java.lang.String\",\"origin\":\"java.lang.String\",\"correlation-
id\":\"java.lang.String\",\"spring.cloud.stream.sendto.destination\":\"java.lang.String\",\"host\":\"java.lang.String\",\"x-
request-start\":\"java.lang.String\",\"content-type\":\"java.lang.String\",\"x-of-
instanceindex\":\"java.lang.String\",\"connection\":\"java.lang.String\",\"sec-fetch-
mode\":\"java.lang.String\",\"accept-language\":\"java.lang.String\",\"event-type-code\":\"java.lang.String\",\"x-
forwarded-proto\":\"java.lang.String\",\"x-vcap-request-
id\":\"java.lang.String\",\"accept\":\"java.lang.String\",\"access-control-allow-origin\":\"java.lang.String\",\"x-of-
applicationid\":\"java.lang.String\",\"x-b3-spanid\":\"java.lang.String\",\"x-b3-traceid\":\"java.lang.String\",\"accept-
encoding\":\"java.lang.String\",\"user-agent\":\"java.lang.String\",\"sec-fetch-dest\":\"java.lang.String\"}"}

ATTRIBUTE CHECKS

FIELD NAME: transactionCurrencyCode
DATA TYPE: {"name":"com.jpm.cib.ms.payment.event.TCC","type":"enum","symbols":
["USD","EUR","GBP","AUD","NZD","SGD","CAD","JPY","HKD","KRW","TWD","MXN","BRL"]}
QUALITY CHECK FAILURE: UNSUPPORTED VALUE

FIELD NAME: paymentBrandName
DATA TYPE: {"name":"com.jpm.cib.ms.payment.event.PBN","type":"enum","symbols":["VISA","MASTERCARD"]}
QUALITY CHECK FAILURE: UNSUPPORTED VALUE

FIELD NAME: paymentBrandCode
DATA TYPE: {"name":"com.jpm.cib.ms.payment.event.PMC","type":"enum","symbols":["VI","MC"]}
QUALITY CHECK FAILURE: UNSUPPORTED VALUE

VALIDATION STATUS: FAIL

FIG. 8D

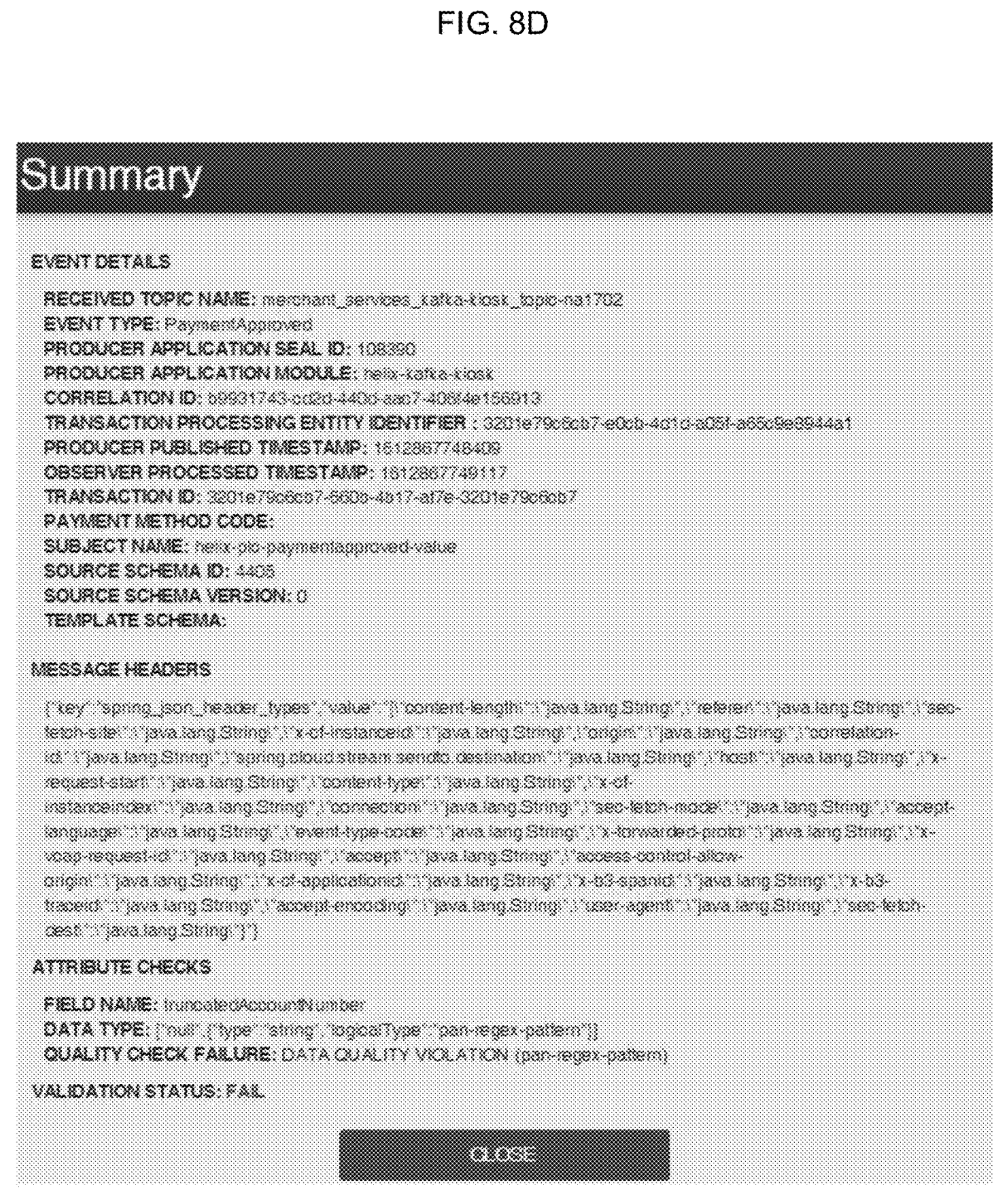

Summary

EVENT DETAILS

RECEIVED TOPIC NAME: merchant_services_kafka-kiosk_topic-na1702
EVENT TYPE: PaymentApproved
PRODUCER APPLICATION SEAL ID: 108360
PRODUCER APPLICATION MODULE: helix-kafka-kiosk
CORRELATION ID: b9931743-cc2d-440d-aac7-408f4e156913
TRANSACTION PROCESSING ENTITY IDENTIFIER : 3201e79c6cb7-e0cb-4d1d-a05f-a65c9e9944a1
PRODUCER PUBLISHED TIMESTAMP: 1612867748409
OBSERVER PROCESSED TIMESTAMP: 1612867749117
TRANSACTION ID: 3201e79c6cb7-6c0c-4b17-af7e-3201e79c6cb7
PAYMENT METHOD CODE:
SUBJECT NAME: helix-pio-paymentapproved-value
SOURCE SCHEMA ID: 4405
SOURCE SCHEMA VERSION: 0
TEMPLATE SCHEMA:

MESSAGE HEADERS

{ "key" "spring_json_header_types", "value" ]} content-length" : "java.lang.String", "referer" : "java.lang.String", "sec-fetch-site" : "java.lang.String", "x-df-instanceid" : "java.lang.String", "origin" : "java.lang.String", "correlation-id" : "java.lang.String", "spring.cloud.stream.sendto.destination" : "java.lang.String", "host" : "java.lang.String", "x-request-start" : "java.lang.String", "content-type" : "java.lang.String", "x-df-instanceindex" : "java.lang.String", "connection" : "java.lang.String", "sec-fetch-mode" : "java.lang.String", "accept-language" : "java.lang.String", "event-type-code" : "java.lang.String", "x-forwarded-proto" : "java.lang.String", "x-wap-request-id" : "java.lang.String", "accept" : "java.lang.String", "access-control-allow-origin" : "java.lang.String", "x-df-applicationid" : "java.lang.String", "x-b3-spanid" : "java.lang.String", "x-b3-traceid" : "java.lang.String", "accept-encoding" : "java.lang.String", "user-agent" : "java.lang.String", "sec-fetch-dest" : "java.lang.String" }}

ATTRIBUTE CHECKS

FIELD NAME: truncatedAccountNumber
DATA TYPE: [ "null" {"type" "string" "logicalType" "pan-regex-pattern"}]
QUALITY CHECK FAILURE: DATA QUALITY VIOLATION (pan-regex-pattern)

VALIDATION STATUS: FAIL

CLOSE

SYSTEM AND METHOD FOR INTEGRATING OBSERVER CAPABILITY WITHOUT LATENCY VIA DYNAMIC APPLICATION OF CUTOMIZABLE EVENT TEMPLATES AND CENTRALIZED VALIDATIONS

TECHNICAL FIELD

This disclosure generally relates to implementing a light weight observer application or system to selectively listen in to motion streams or files in a workflow with negligible or no latency added thereto. Further, the present disclosure relates the observer application or system that is capable of dynamically applying a ruleset on the fly and storing limited or selective set of information associated with a data record, its state, trace and ruleset violations, and providing a report thereof.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

The process of collecting and analyzing large amounts of data is a known challenge that is acknowledged by every enterprise, especially considering that data may come from variety of sources and in a range of qualities. As data continues to evolve at high velocities and varieties, it is essential that an organization is able to understand, connect, and correlate relationships across multiple data linkages within a network ecosystem.

While data in motion contracts between domains or applications made it more flexible to accommodate full transitive and compatibility of schema for upgrade of applications and/or microservices, such flexibility comes at a cost. Conventional analysis and observance of data in motion contracts may be difficult to achieve due in part to large amount of memory required and amount of latency created by performing such analysis and observance. For example, conventional technology utilizes application of rule sets to captured data records. However, such practice relies on an initial storage of such data records before rule sets are to be later applied in time in a batch cycle. Accordingly, large amount of computing resources may be required for the initial storage and subsequent application of rules. Moreover, due to the conventional processing, any analysis reporting of the data records may be delayed due to the inherent latency in the process.

Further, inter-domain transactions made it more difficult to identify or establish a workflow of a data record. More specifically, conventional analysis and observance of inter-domain transactions may require separate analysis for performing workflow compliance or validation. However, given the multi-step processing required for such analysis of workflow compliance or validation, any error in workflow compliance or validation may be uncovered later in time, leaving an organization with little or no options for providing a timely fix.

In addition to the above noted technical challenges and limitations, conventional report generation based on the inter-domain transactions or messages may be very cumbersome, and limited in value due to lack of vectors captured. More specifically, the conventional communication or validation process may be limited to capturing only two or three vectors of observability data, providing for limited insight and leading to less precise predictions, and thus providing a lowered usability of such information.

SUMMARY

The present disclosure, through one or more of its various aspects, embodiments, and/or specific features or sub-components, provides, among other features, a method for performing dynamic observations of inter-domain event processing in real-time is provided. The method includes receiving, via a processor and at an upstream application, an inter-domain event; serializing, via the upstream application executed by the processor, the inter-domain event; transmitting, via the upstream application to an event streaming platform, the serialized inter-domain event as a data stream; extracting, by the event streaming platform, a topic for the serialized inter-domain event; transmitting, by the event streaming platform, the serialized inter-domain event; identifying, via an observer application executed by the processor, a workflow corresponding to the identified topic; deserializing, via the observer application executed by the processor, the serialized inter-domain event; applying, via the observer application executed by the processor, an event template corresponding to the deserialized inter-domain event; based on the applying of the event template and via the observer application executed by the processor, dynamically identifying and applying a corresponding rule set without first requiring storage of the inter-domain event as a data object; capturing, by the observer application executed by the processor, attributes corresponding to the inter-domain event based on the applied rule set; and storing, in a database, a data record of the inter-domain event with the captured attributes.

In some embodiments, the method may further include: validating, by the observer application executed by the processor, each operation of the workflow was successfully performed or not.

In some embodiments, the method may further include: validating, by the observer application executed by the processor, each of the applied rule set for determining whether each rule in the applied rule set was violated or not.

In some embodiments, the event template is customizable for capturing differing attributes of the inter-domain event without requiring a change to an underlying application.

In some embodiments, the observer application is configured to centrally perform all validations for the inter-domain event processing.

In some embodiments, the observer application is a third party to the upstream application and a downstream application that is to consume the data stream transmitted by the upstream application.

In some embodiments, the method may further include: building, by the event streaming platform, a data pipeline for the serialized inter-domain event; and transmitting, by the event streaming platform and to a downstream application, the serialized inter-domain event for consumption by the downstream application.

In some embodiments, the event streaming platform contemporaneously transmits the serialized inter-domain event to both the observer application and the downstream application.

In some embodiments, the event template creates at least one restriction.

In some embodiments, the event template creates at least one requirement.

In some embodiments, the event template replaces at least one attribute with another attribute.

In some embodiments, the method may further include: deriving, by the processor, at least one additional attribute based on the captured attributes.

In some embodiments, an amount of the attributes captured is minimal to prevent creating data latency.

In some embodiments, the attributes are captured dynamically based on the applied rule set.

In some embodiments, at least one attribute is captured based on a violation of the identified workflow.

In some embodiments, the method may further include: generating, by the processor, a plurality of vectors greater than three based on the captured attributes; identifying, by the processor, a plurality of historical data records based on the plurality of vectors; first training, by the processor, a machine learning (ML) model using the plurality of vectors and the plurality of historical data records identified; and applying, by the processor, the first trained ML model on the inter-domain event and generating a prediction of an outcome of the inter-domain event.

In some embodiments, the method may further include: tracking, by the processor, a result of the inter-domain event; comparing, by the processor, the result with the predicted outcome; providing, by the processor, a correction to the result when the result is different from the predicted outcome; and second training, by the processor, the first trained ML model with the correction.

In some embodiments, the method may further include: generating, by the processor, a report of the data record of the inter-domain event with the captured attributes.

In some embodiments, a system for performing dynamic observations of inter-domain event processing in real-time is disclosed. The system may include: a processor configured to execute one or more applications; and a memory operatively connected to the processor via a communication interface, the memory storing computer readable instructions, when executed, causes the processor to: receive, at an upstream application, an inter-domain event; serialize, via the upstream application, the inter-domain event; transmit, from the upstream application to an event streaming platform, the serialized inter-domain event as a data stream; extract, by the event streaming platform, a topic for the serialized inter-domain event; transmit, by the event streaming platform, the serialized inter-domain event; identify, at an observer application, a workflow corresponding to the identified topic; deserialize, at the observer application, the serialized inter-domain event; apply, via the observer application, an event template corresponding to the deserialized inter-domain event; based on the event template applied and by the observer application, dynamically identify and apply a corresponding rule set without first requiring storage of the inter-domain event as a data object; capture, via the observer application, attributes corresponding to the inter-domain event based on the applied rule set; and store, in a database, a data record of the inter-domain event with the captured attributes.

In some embodiments, a non-transitory computer readable medium configured to store instructions for performing dynamic observations of inter-domain event processing in real-time is disclosed. The instructions, when executed, may cause a processor to perform the following: receive, at an upstream application, an inter-domain event; serialize, via the upstream application, the inter-domain event; transmit, from the upstream application to an event streaming platform, the serialized inter-domain event as a data stream; extract, by the event streaming platform, a topic for the serialized inter-domain event; transmit, by the event streaming platform, the serialized inter-domain event; identify, at an observer application, a workflow corresponding to the identified topic; deserialize, at the observer application, the serialized inter-domain event; apply, via the observer application, an event template corresponding to the deserialized inter-domain event; based on the event template applied and by the observer application, dynamically identify and apply a corresponding rule set without first requiring storage of the inter-domain event as a data object; capture, via the observer application, attributes corresponding to the inter-domain event based on the applied rule set; and store, in a database, a data record of the inter-domain event with the captured attributes.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates a system flow of an integrated observer system in accordance with an embodiment.

FIGS. 8A-D illustrate an observer system dashboard providing a summary of events processed with access to a corresponding report in accordance with an embodiment.

DETAILED DESCRIPTION

Figure 1:
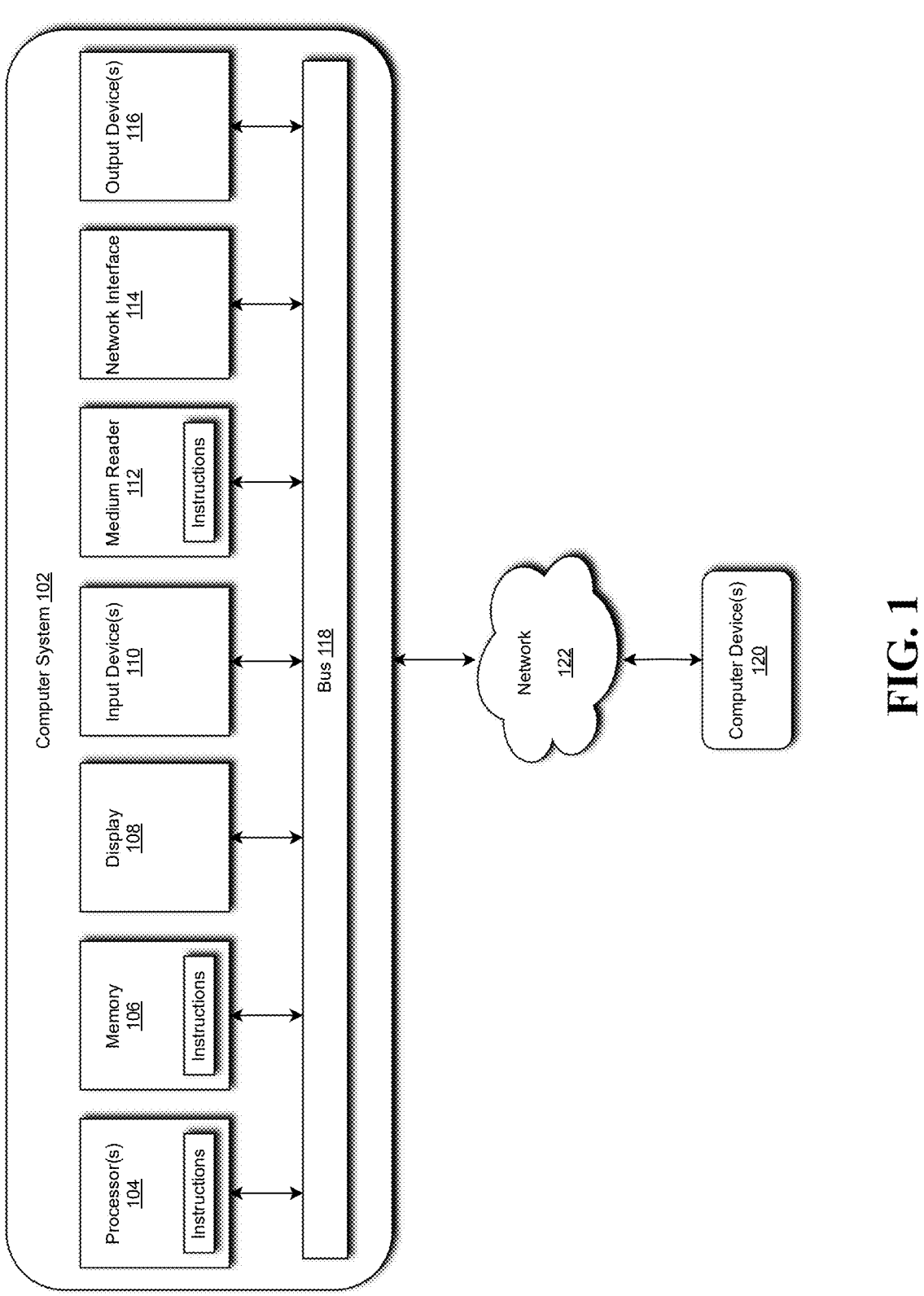
FIG. 1 illustrates a computer system for implementing an observer system in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is a system 100 for use in implementing an observer system in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 may be a personal computer. However, those skilled in the art appreciate that, in alternative embodiments of the present application, the computer device 120 may also be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the observer module implemented by the system 100 may allow for an observer module configured for dynamically apply an event template to an inter-domain event for identifying a corresponding workflow and apply a rule set on the fly, and dynamically and centrally performing validations. Further, the disclosed observer module allows for independent tuning or modifications of event templates without requiring a modification to an underlying application, such that the event templates may be modified and applied in real-time without requiring storage of data records.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
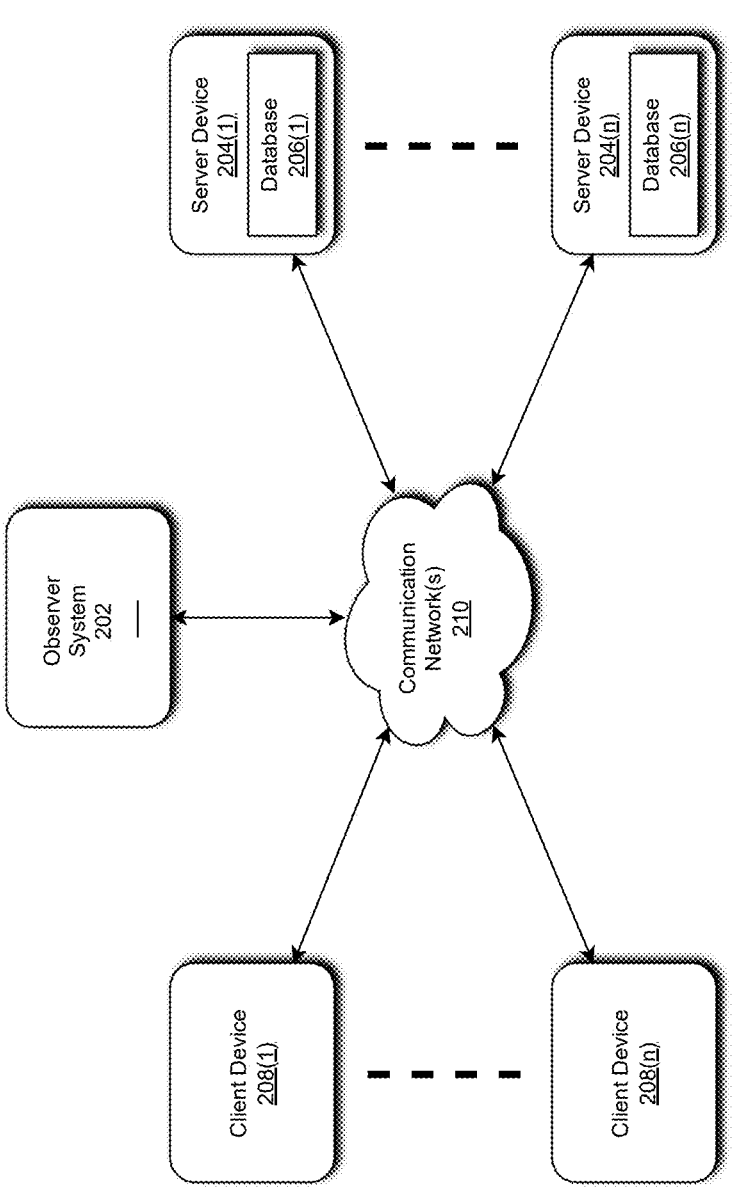
FIG. 2 illustrates a diagram of a network environment for implementing an observer system in accordance with an embodiment.

Referring to FIG. 2, a schematic of a network environment 200 for implementing an observer system is illustrated.

In some embodiments, the above-described problems associated with conventional observation tools may be overcome by implementing an observer system 202 as illustrated in FIG. 2 that may be configured for implementing an observer module configured for dynamically apply an event template to an inter-domain event for identifying a corresponding workflow and apply a rule set on the fly, and dynamically and centrally performing validations, but the disclosure is not limited thereto.

The observer system 202 may include one or more computer system 102s, as described with respect to FIG. 1, which in aggregate provide the necessary functions.

The observer system 202 may store one or more applications that can include executable instructions that, when executed by the observer system 202, cause the observer system 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the observer system 202 itself, may be located in virtual server(s) running in a cloud-based computing environment rather than being tied to one or more specific physical network computing devices. Also, the application(s) may be running in one or more virtual machines (VMs) executing on the observer system 202. Additionally, in one or more embodiments of this technology, virtual machine(s) running on the observer system 202 may be managed or supervised by a hypervisor.

In the network environment 200 of FIG. 2, the observer system 202 may be coupled to a plurality of server devices 204(1)-204(n) that hosts a plurality of databases 206(1)-206(n), and also to a plurality of client devices 208(1)-208(n) via communication network(s) 210. A communication interface of the observer system 202, such as the network interface 114 of the computer system 102 of FIG. 1, operatively couples and communicates between the observer system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the observer system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The observer system 202 may be a standalone device or integrated with one or more other devices or apparatuses, such as one or more of the server devices 204(1)-204(n), for example. In one particular example, the observer system 202 may be hosted by one of the server devices 204(1)-204(n), and other arrangements are also possible. Moreover, one or more of the devices of the observer system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the observer system 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

In some embodiments, the client devices 208(1)-208(n) in this example may include any type of computing device that can facilitate the implementation of the observer system 202 that may efficiently provide an observer module configured for dynamically apply an event template to an inter-domain event for identifying a corresponding workflow and apply a rule set on the fly, and dynamically and centrally performing validations, but the disclosure is not limited thereto.

The client devices 208(1)-208(n) may run interface applications, such as standard web browsers or standalone client applications, which may provide an interface to communicate with the observer system 202 via the communication network(s) 210 in order to communicate user requests. The client devices 208(1)-208(n) may further include, among other features, a display device, such as a display screen or touchscreen, and/or an input device, such as a keyboard, for example.

Although the network environment 200 with the observer system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the observer system 202, the server devices 204(1)-204(n), or the client devices 208(1)-208(n), for example, may be configured to operate as virtual instances on the same physical machine. For example, one or more of the observer system 202, the server devices 204(1)-204(n), or the client devices 208(1)-208(n) may operate on the same physical device rather than as separate devices communicating through communication network(s) 210. Additionally, there may be more or fewer observer system s 202, server devices 204(1)-204(n), or client devices 208(1)-208(n) than illustrated in FIG. 2. In some embodiments, the observer system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
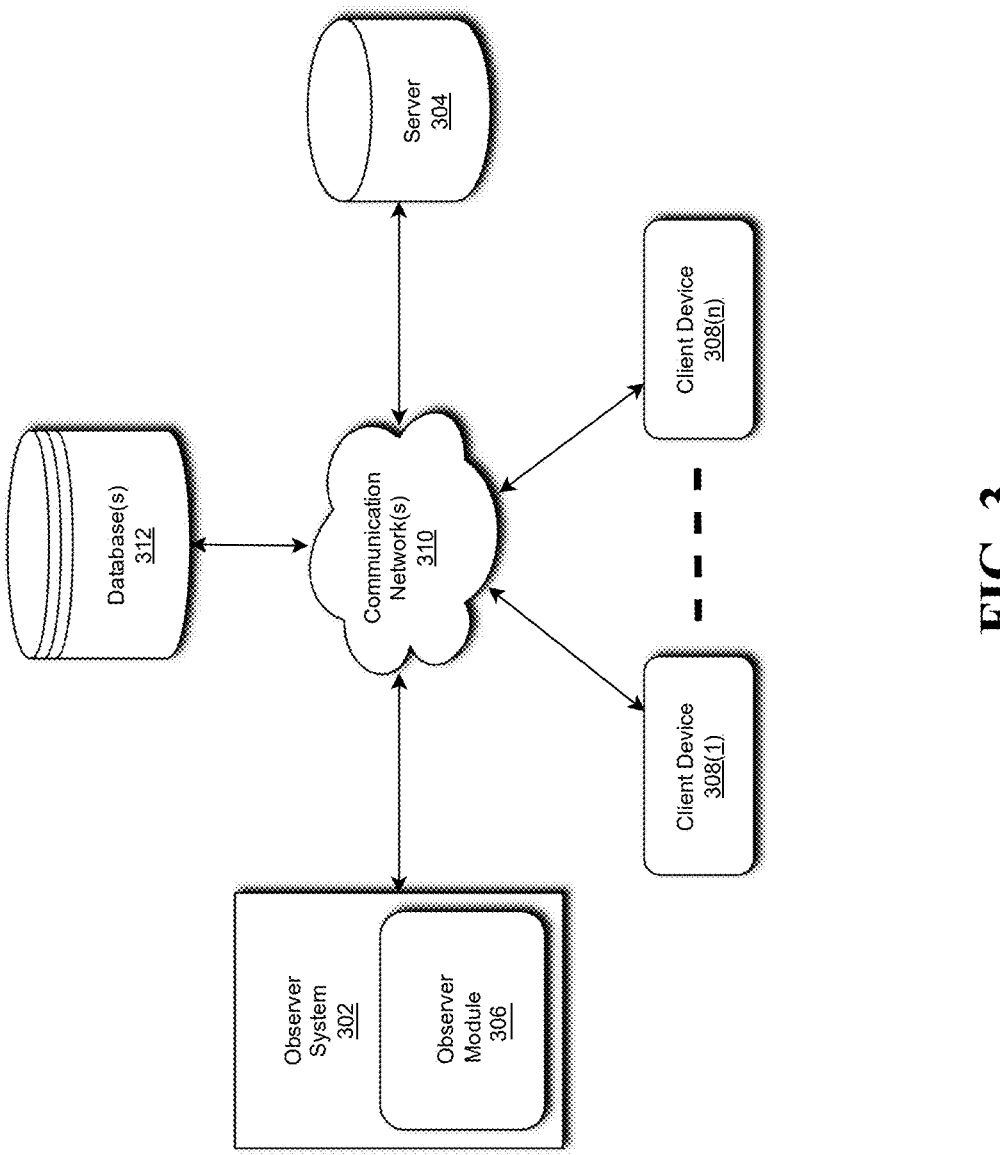
FIG. 3 illustrates a system configuration diagram for implementing an observer system in accordance with an embodiment.

FIG. 3 illustrates a system diagram for implementing an observer system in accordance with an embodiment.

As illustrated in FIG. 3, the system 300 may include an observer system 302 within which an observer module 306 is embedded, a server 304, a database(s) 312, a plurality of client devices 308(1) . . . 308(n), and a communication network 310.

In some embodiments, the observer system 302 including the observer module 306 may be connected to the server 304, and the database(s) 312 via the communication network 310. The observer system 302 may also be connected to the plurality of client devices 308(1) . . . 308(n) via the communication network 310, but the disclosure is not limited thereto. The database(s) 312 may include one or more rule databases.

In an embodiment, the observer system 302 is described and shown in FIG. 3 as including the observer module 306, although it may include other rules, policies, modules, databases, or applications, for example. In some embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

In some embodiments, the observer module 306 may be configured to receive real-time feed of data from the plurality of client devices 308(1) . . . 308(n) and secondary sources via the communication network 310.

The observer module 306 may be configured to: detecting an inter-domain event; identifying and extracting a topic for the inter-domain event; identifying a workflow corresponding to the identified topic; dynamically applying an event template corresponding to the deserialized inter-domain event; based on the applying of the event template, dynamically identifying and applying a corresponding rule set without first requiring storage of the inter-domain event as a data object; and capturing attributes corresponding to the inter-domain event based on the applied rule set, but the disclosure is not limited thereto.

The plurality of client devices 308(1) . . . 308(n) are illustrated as being in communication with the observer system 302. In this regard, the plurality of client devices 308(1) . . . 308(n) may be "clients" (e.g., customers) of the observer system 302 and are described herein as such. Nevertheless, it is to be known and understood that the plurality of client devices 308(1) . . . 308(n) need not necessarily be "clients" of the observer system 302, or any entity described in association therewith herein. Any additional or alternative relationship may exist between either or both of the plurality of client devices 308(1) . . . 308(n) and the observer system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(n) may communicate with the observer system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The observer system 302 may be the same or similar to the observer system 202 as described with respect to FIG. 2, including any features or combination of features described with respect thereto.

Figure 4:
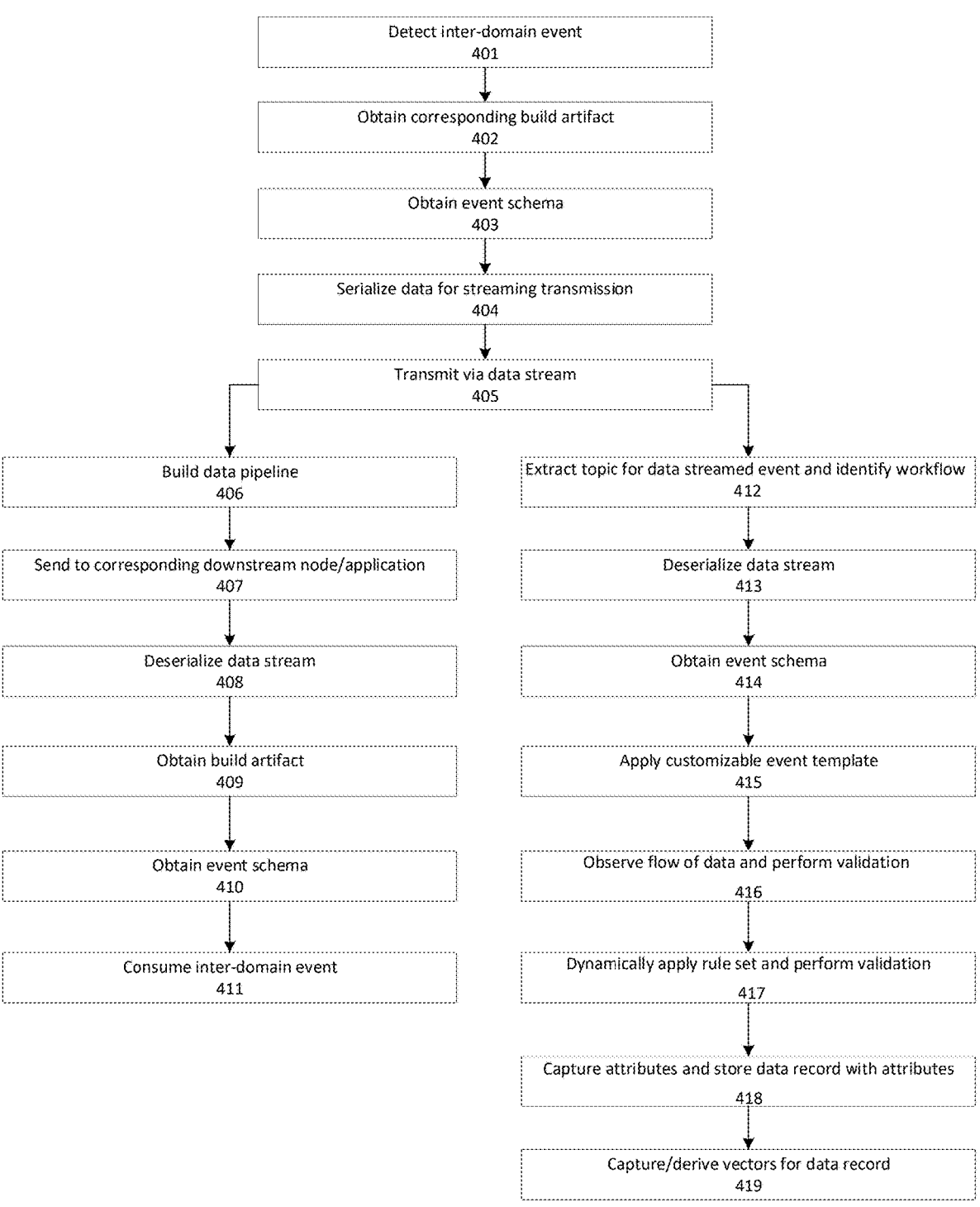
FIG. 4 illustrates a method for observing an inter-domain event and dynamically applying a rule set to the inter-domain event with validations in real-time in accordance with an embodiment.

FIG. 4 illustrates a method for observing an inter-domain event and dynamically applying a rule set to the inter-domain event with validations in real-time in accordance with an embodiment.

In operation 401, an inter-domain event may be detected at an upstream node or application. According to exemplary aspects, an event may refer to an action or occurrence recognized by a software. An inter-domain event may refer to an event that occurs between two or more domains.

In operation 402, corresponding build artifact may be obtained from a central repository. According to exemplary aspects, the central repository may refer to a repository management component or module that organizes, stores and/or distributes artifacts utilized for development. In an example, build artifact may include Java Archive (JAR) file formatted files. JAR file format may be based on a ZIP file format and is used for aggregating many files into one. Further, the JAR file may be a package file format utilized for aggregating many Java class files and associated metadata and resources into a single file for distribution. Although JAR file formatted files are disclosed herein, aspects of the present disclosure are not limited thereto, such that other formatted files that are capable of aggregating multiple files, associated metadata and/or resources into a single file may be utilized.

In operation 403, an event schema corresponding to the inter-domain event is obtained from a central schema registry. According to exemplary aspects, the event schema may refer to a structured representation of an event and its associated attributes used in data analysis platforms. More specifically, the event schema may define an expected format, type, constraints and other rules associated with respect to event data or type to ensure consistency and accuracy.

In operation 404, a data object or structure of the inter-domain event may be serialized for streaming transmission. According to exemplary aspects, the data serialization may include converting a data object or data structure into a stream of bytes for transmitting a data stream.

In operation 405, the serialized data is transmitted over a network as a data stream. According to exemplary aspects, the serialized data may be transmitted to an event streaming platform. According to exemplary aspects, the event streaming platform may be utilized to build real-time streaming data pipelines and applications that adapt to the data streams. A data pipeline or workflow may reliably process and move data from one system to another. According to further aspects, the event streaming platform may provide a message broker solution by providing a platform that processes and mediates communications between two applications, nodes or modules.

Moreover, the event streaming platform may be configured to filter inter-domain events according to their respective topics, which may identify corresponding workflows for the respective inter-domain events. In an example, a workflow may indicate required steps or operations for the respective workflow. However, aspects of the present disclosure are not limited thereto, such that the workflow may additionally indicate prohibited operations or data types, optional operations, acceptable data types and the like. From operation 405, the method may contemporaneously, or in parallel, proceed to operation 406 and operation 412.

In operation 406, the event streaming platform may build a data pipeline based on the data stream sent by the upstream node or application. According to exemplary aspects, a data pipeline may include various technologies to verify, summarize, and find patterns in data.

In operation 407, the event streaming platform may relay the processed inter-domain event in a data stream to a corresponding downstream node or application. According to exemplary aspects, the downstream node or application may be a consumer, and may have capability to deserialized the received data stream, obtain corresponding build artifact, and obtain a corresponding event schema for reconstructing and processing the data object or structure from the received data stream.

In operation 408, the downstream node or application may deserialize the received data stream. According to exemplary aspects, the deserialization may be a reverse process of construction a data structure or object from the series of bytes received via the data stream.

In operation 409, the downstream node or application may obtain a corresponding build artifact from the central repository.

In operation 410, the downstream node or application may additionally obtain a corresponding event schema from the central schema registry.

In operation 411, the downstream node or application may reconstruct the data object or structure from the data stream using the obtained build artifact and event schema, and processing the reconstructed data object or structure via one or more event handlers. According to exemplary aspects, an event handler may refer to a program function executed by the downstream node or application.

In operation 412, the event streaming platform may identify and extract a topic for the received data streamed inter-domain event. According to exemplary aspects, each inter-domain event may include or indicate a topic in its metadata or as its attribute. In an example, the topic information may be stored in the header information of the inter-domain event. However, aspects of the present disclosure are not limited thereto, such that the topic information may be stored elsewhere.

In operation 413, the received data stream is deserialized. According to exemplary aspects, the deserialization may be a reverse process of construction a data structure or object from the series of bytes received via the data stream.

In operation 414, corresponding event schema is obtained for reconstructing the data object or structure from the deserialized data stream.

In operation 415, a customizable event template is applied to the reconstructed data object or structure. According to exemplary aspects, the customizable event template may be obtained from the central schema registry. In an example, the customizable event template may be selected for application from the central schema registry based on the extracted topic information of the inter-domain event. However, aspects of the present disclosure are not limited thereto, such that the customizable event template may be selected according to a different attribute or attributes of the inter-domain event. Moreover, the customizable event template may be configured to obtain, modify, replace or otherwise manipulate one or more attributes of a data record, without requiring a modification of an application. Accordingly, one or more templates may be created to reflect rule changes of an organization, without requiring modifications to applications. Accordingly, downtimes to applications may be minimized, and stability of applications may be maintained while providing an ability to dynamically modify rule applications.

In operation 416, an observer module or application may observe the flow of data based on the applied template, and further perform a validation of the dataflow or the workflow of the respective inter-domain event. In an example, the flow of data or the workflow of the respective inter-domain event may be based on the topic information of the inter-domain event and/or the applied template. Based on the observed flow of data or workflow, a validation may be performed to ensure all of the operations within the workflow have been performed. Any steps or operations in the workflow not performed maybe captured and indicated as an error.

In operation 417, based on the observed flow of data, a rule set may be dynamically applied in real-time. In addition, a validation may be performed on the dynamically applied ruleset to check for violations of any of the rules included in the dynamically applied ruleset. Any violation to the applied ruleset may be captured and indicated as an error. According to exemplary aspects, a rule set may specify one or more restrictions, additional requirements, incompatibilities based on one or more attributes in the respective data record or object. Further, the rule set may be selectively applied to capture minimum amount of metadata for the respective data record or object to reduce size of payload for processing and to avoid creating latency to the underlying data transactions.

In operation 418, data records with validation data may be stored in a database. According to exemplary aspects, validation data may include metadata captured based on a validation with the rule set, such as violation of certain rules and identification of one or more rules that were violated. Moreover, the validation data may additionally include metadata captured based on a validation of the identified work flow, such as omission of a certain step within the identified work flow. In an example, the database may be a distributed, wide-column store, No SQL database management system configured to manage large amounts of data across multiple servers.

Figure 5:
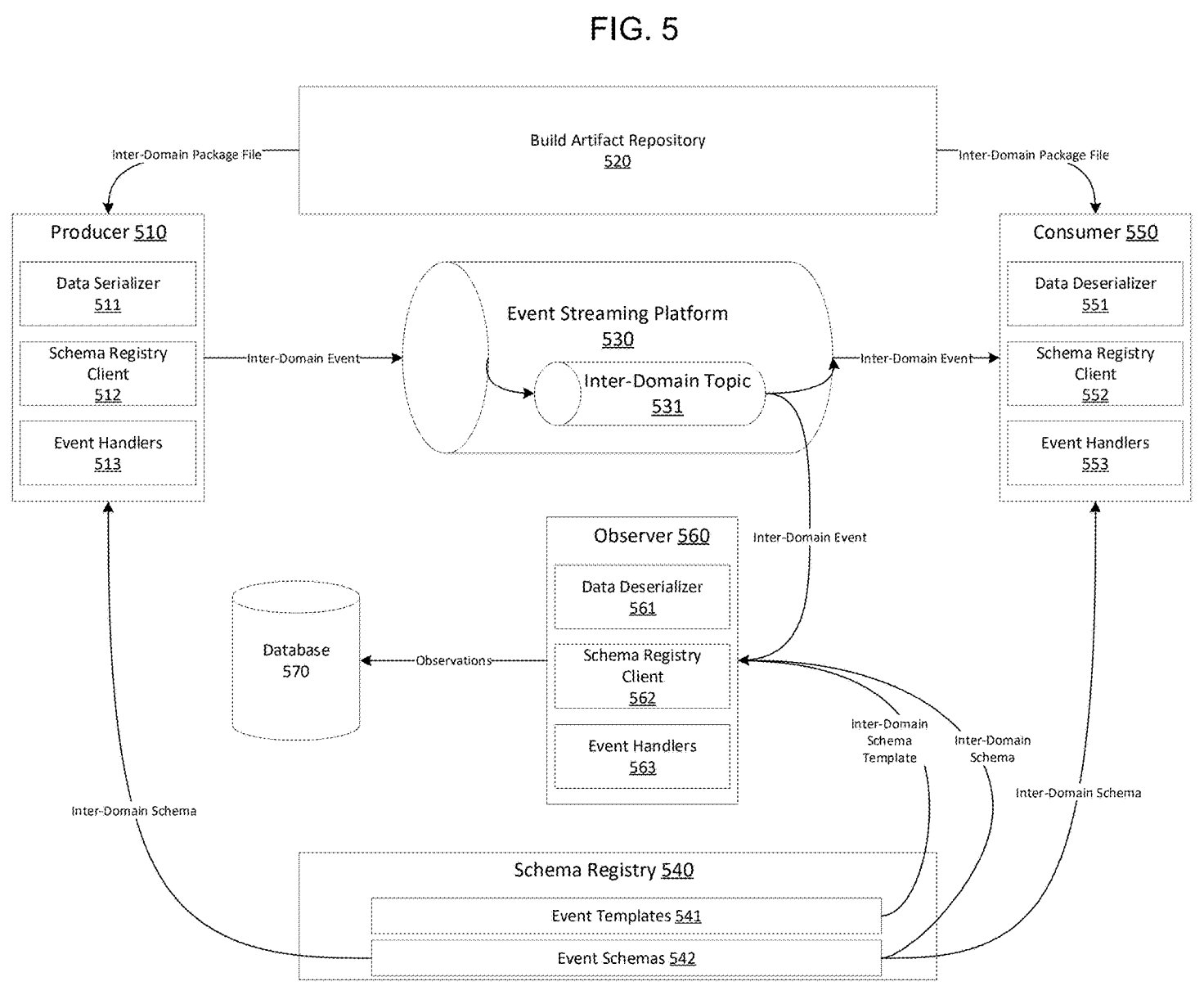

FIG. 5 illustrates a system flow of an integrated observer system in accordance with an embodiment.

According to exemplary aspects, an observer system provides a scalable configuration for capturing and monitoring the flow of data across distributed systems without significantly impeding or disturbing any existing operational speeds, if at all. In addition, the observer system may improve data quality by increasing attribute level validations for generating higher degree or number of vectors without adding any new workflows to existing systems.

In addition to subscribing and consuming messages, the observer system may be configured to extract, process and validate message payload and any additional data for performing meaningful analytics. Moreover, the observer system may inject and/or apply validations templates, which may be configurable and may be based on a variety of factors, without limitation, an event type, environment, system requirements, other requirements/objectives and the like.

The system configuration of FIG. 5 includes a producer 510, a build artifact repository 520, and a consumer 550. The producer 510 includes a data serializer 511, a schema registry client 512 and event handlers 513. The consumer 550 includes a data serializer 551, a schema registry client 552 and event handlers 553.

According to exemplary aspects, the data serializer 511 may convert a data object or data structure into a stream of bytes for transmitting a data stream. The data deserializer 551 performs a reverse process of constructing a data structure or object from the series of bytes that are received. The schema registry client 512 and the schema registry client 552 may refer to modules for facilitating receiving one or more event schemas 542 stored in the schema registry 540. Event handlers 513 and the event handlers 553 may refer to program functions executed by the application or the producer 510/consumer 550 when an event is executed on the application. The executed program functions may in turn execute other functions, spawn threads, and/or trigger timer-based or condition based code execution. An event may refer to an action or occurrence recognized by a software. An inter-domain event may refer to an event that occurs between two or more domains.

According to exemplary aspects, the producer 510 may refer to an upstream node, component, application or module. The producer 510 may generate and/or transmit an inter-domain event to a downstream node, component, application or module, such as the consumer 550. In addition, the producer 510 may perform data validation prior to transmission. Based on the performed data validation at the producer 510, metadata for generating a data vector may be generated. The consumer 550 may also perform data validation upon receipt of the inter-domain event. Based on the performed data validation at the consumer 550, metadata or attribute for generating a data vector may be generated. According to exemplary aspects, the consumer 550 may be subscribed to one or more topics or inter-domain topics. The consumer 550 may be configured to process one or more event types.

According to exemplary aspects, the build artifact repository 520 may refer to a repository management component or module that organizes, stores and/or distributes artifacts utilized for development. According to further aspects, the build artifact repository 520 may allow developers to control access to and deployment of an artifact in an organization from a single repository. In an example, the build artifact repository 520 may include JAR file formatted files. JAR file format may be based on a ZIP file format and is used for aggregating many files into one. Further, the JAR file may be a package file format utilized for aggregating many Java class files and associated metadata and resources into a single file for distribution. Although JAR file formatted files are disclosed herein, aspects of the present disclosure are not limited thereto, such that other formatted files that are capable of aggregating multiple files, associated metadata and/or resources into a single file may be utilized.

The system configuration of FIG. 5 may also include an event streaming platform 530 and schema registry 540. According to exemplary aspects, the event streaming platform 530 may include an inter-domain topic storage 531. The inter-domain topic storage 531 may extract and separately store inter-domain topics from the inter-domain events that are processed through the event streaming platform 530. Further, the inter-domain topic storage 531 may allow filtration of inter-domain events according to their respective topics, which may identify corresponding workflows for the respective inter-domain events. In an example, a workflow may indicate required steps or operations for the respective workflow. However, aspects of the present disclosure are not limited thereto, such that the workflow may additionally indicate prohibited operations or data types, optional operations, acceptable data types and the like.

According to exemplary aspects, the event streaming platform 530 may be utilized to build real-time streaming data pipelines and applications that adapt to the data streams. A data pipeline may reliably process and move data from one system to another, and a streaming application may refer to an application that consumes streams of data. According to further aspects, the event streaming platform 530 may capture/ingest metadata and temporarily store streaming data while serving reads for the applications powering the data pipeline. The event streaming platform 530 may also provide a message broker solution by providing a platform that processes and mediates communications between two applications, nodes or modules.

As exemplarily illustrated in FIG. 5, when the producer 510 transmits an inter-domain event, it first sends to the event streaming platform 530, which then builds a real-time streaming data pipeline(s) and/or applications, and moves the received inter-domain event to the consumer 550 via the real-time streaming data pipeline(s).

Further, the schema registry 540 may store event templates 541 in addition to the event schemas 542. According to exemplary aspects, the event templates 541 may include one or more event templates and may refer to a structured representation of an event type and its associated properties. Further, the event templates 541 may define an expected format, types, and constraints of event data to ensure consistency and accuracy. In an example, the event templates 541 may be customizable, such that event templates 541 may be modified instead of requiring a change to an application. The event templates 541 may, for example, may be customized to replace certain attributes in a data record.

The system configuration of FIG. 5 further includes an observer 560, which may be a device or component. The observer 560 includes a data serializer 561, a schema registry client 562, and event handlers 563. The observer 560 may process inter-domain events aggregated or stored in the inter-domain topic 531. Moreover, the observer 560 additionally receive and process one or more inter-domain schema templates from the event templates 541. The observer 560 may also receive and process one or more inter-domain schema from the event schemas 542.

According to exemplary aspects, the data deserializer 561 performs a reverse process of constructing a data structure or object from the series of bytes that are received. The schema registry client 562 may refer to a module for facilitating receiving one or more event schemas 542 stored in the schema registry 540. According to exemplary aspects, the event schema received by the schema registry client 562 may be the same event schema received by the schema registry client 552 and/or the schema registry client 512. However, the event schema received by the schema registry client 562 may additionally have one or more inter-domain schema template applied from the event templates 541. Event handlers 563 may refer to program functions executed by the application or the observer 560 when an event is executed on the application. The executed program functions may in turn execute other functions, spawn threads, and/or trigger timer-based or condition based code execution. An event may refer to an action or occurrence recognized by a software. An inter-domain event may refer to an event that occurs between two or more domains.

According to exemplary aspects, the event templates 541 stored in the schema registry 540 may include one or more customizable event templates. The customizable event template may be configured to obtain, modify, replace or otherwise manipulate one or more attributes of a data record, without requiring a modification of an application. Accordingly, one or more templates may be created to reflect rule changes of an organization, without requiring modifications to applications. Accordingly, downtimes to applications may be minimized, and stability of applications may be maintained while providing an ability to dynamically modify rule applications.

According to further aspects, once an event template corresponding to the deserialized data streamed inter-domain event is identified and applied from the event templates 541 stored in the schema registry 540, the observer 560 may observer the flow of data based on the applied event template. Based on the observed flow of data, a rule set may be dynamically applied in real-time. According to exemplary aspects, a rule set may specify one or more restrictions, additional requirements, incompatibilities based on one or more attributes in the respective data record or object. Further, the rule set may be selectively applied to capture minimum amount of metadata for the respective data record or object to reduce size of payload for processing and to avoid creating latency to the underlying data transactions.

Once a rule set corresponding to the inter-domain event is applied, data record of the inter-domain event may be stored with validation data may be stored in a database. According to exemplary aspects, validation data may include metadata captured based on a validation with the rule set, such as violation of certain rules and identification of one or more rules that were violated. Moreover, the validation data may additionally include metadata captured based on a validation of the identified work flow, such as omission of a certain step within the identified work flow. In an example, the database may be a distributed, wide-column store, No SQL database management system configured to handle large amounts of data across multiple servers.

Figure 6:
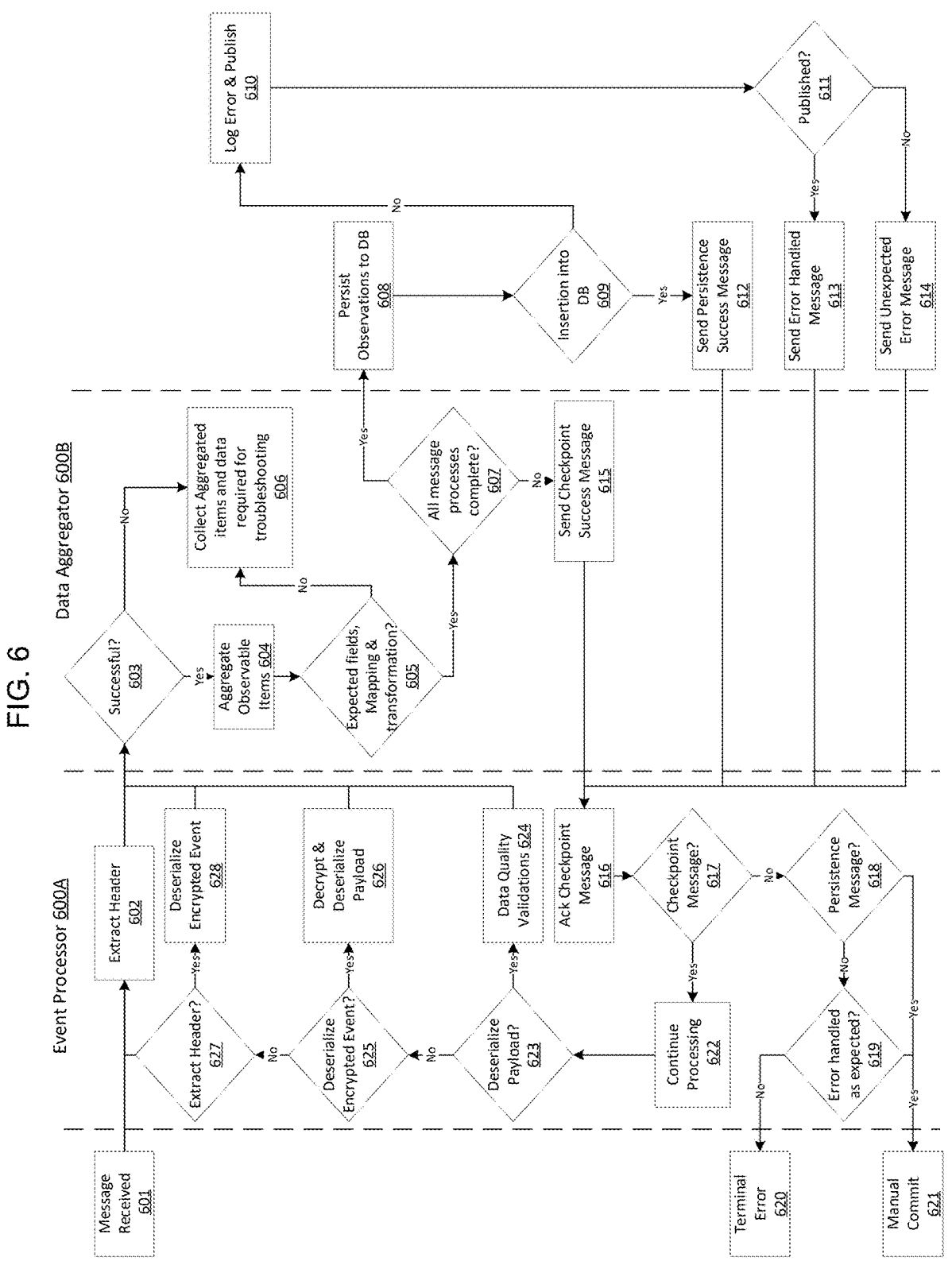
FIG. 6 illustrates a process flow of an event in accordance with an embodiment.

FIG. 6 illustrates a process flow of an event in accordance with an embodiment.

According to exemplary aspects, an observer system or module includes an event processor 600A, a data aggregator 600B and a persistence layer 600C. In operation 601, the event processor 600A receives a message. According to exemplary aspects, the message may refer to an inter-domain event message.

In operation 602, one or more header information may be extracted from the received message by the event processor 600A. If the header extraction is determined to be successful in operation 603 by the data aggregator 600B, then the process flow proceeds to operation 605. On the other hand, if the header extraction is determined to be unsuccessful, the process flow proceeds to operation 606. In operation 606, the data aggregator 600B collects aggregated items and data required for trouble shooting. In operation 605, the data aggregator 600B checks to determine whether observable items includes expected fields, mapping and/or transformations. If the data aggregator 600B determines that the observable items do not include the expected fields, mapping and/or transformations, then the process flow proceeds to operation 606. On the other hand, if the data aggregator 600B determines that the observable items include the expected fields, mapping and/or transformations, then the process flow proceeds to operation 607.

In operation 607, the data aggregator 600B checks to determine whether all of the message processing operations have been completed. If not all of the message processing operations have been completed for the received message, then the process flow proceeds to operation 615. On the other hand, if all of the message processing operations have been completed for the received message, then the process flow proceeds to operation 608.

In operation 608, the persistence layer 600C persists observations to a database. In an example, the database may be a distributed, wide-column store, No SQL database management system configured to handle large amounts of data across multiple servers.

In operation 609, the persistence layer 600C checks to determine whether the observations have been successfully inserted into the database. If the persistence layer 600C determines that the observations have been successfully inserted into the database, then the process flow proceeds to operation 612. On the other hand, if the persistence layer 600C determines that the observations have not been successfully inserted into the database, then the process flow proceeds to operation 610.

In operation 612, the persistence layer 600C sends persistence successful message to the event processor 600A for performance of operation 616.

In operation 610, the persistence layer 600C logs error and publish to a message queue. In an example, the message queue may temporarily store messages that the observer is unable to process due to errors.

In operation 611, the persistence layer 600C checks to determine whether the error has been successfully published to the message queue. If the error is determined to be successfully published, then the process flow proceeds to operation 613. If the error is determined not to be successfully published, then the process flow proceeds to operation 614. In operation 613, the persistence layer 600C sends error handled message to the event processor 600A for performance of operation 616. In operation 614, the persistence layer 600C sends unexpected error message to the event processor 600A for performance of operation 616.

In operation 616, the event processor 600A generates an acknowledge checkpoint message indicating receipt of the messages sent in operation 612, operation 613, operation 614 and operation 615.

In operation 617, the event processor 600A determines whether the checkpoint message was successfully acknowledged. If the event processor 600A determines that the checkpoint message was not successfully acknowledged, then the process flow proceeds to operation 618. In operation 618, the event processor 600A checks to determine if persistence message was successful or not. If the persistence message is determined to be successful in operation 618, then the process flow proceeds to operation 621 for manual commit. On the other hand, if the persistence message is determined not to be successful in operation 618, the process flow proceeds to operation 619. In operation 619, the event processor 600A checks to determine whether error was handled as expected. If the error was not handled as expected, then the process flow proceeds to operation 621 for manual commit. However, if the error was handled as expected in operation 619, the event processor 600A outputs a terminal error in operation 620.

Alternatively, if the event processor 600 determines in operation 617 that the checkpoint message is successfully acknowledged, then the process flow proceeds to operation 622, which continues the processing of the message received. Continued processing of the received message may include deserializing and/or decrypting the received message. Further, continued processing may further include performing data quality validations.

In operation 623, the event processor 600A may check to determine if the continued processing successfully deserialized the payload associated with the received message. When the event processor 600A determines that the payload has been successfully deserialized, the process flow proceeds to operation 624 for performing data quality validations before looping back to operation 603. Alternatively, when the event processor 600A determines that the payload did not successfully deserialized, the process flow proceeds to operation 625.

In operation 625, the event processor 600A may check to determine if the continued processing successfully deserialized an encrypted event. When the event processor 600A determines that the encrypted event has been successfully deserialized, the process flow proceeds to operation 626 for decrypting the deserialized event and deserializing the decrypted payload before looping back to operation 603. Alternatively, when the event processor 600A determines that the encrypted event did not successfully deserialize, the process flow proceeds to operation 627.

In operation 627, the event processor 600A performs a check to determine whether extraction of headers was successful. If the extraction of the headers is determined to be unsuccessfully performed, the process flow proceeds back to operation 602 to re-perform the extraction of headers. On the other hand, if the extraction of the headers is determined to be successfully performed, the process flow proceeds to operation 628 for deserializing the encrypted event prior to looping back to operation 603.

Figure 7:
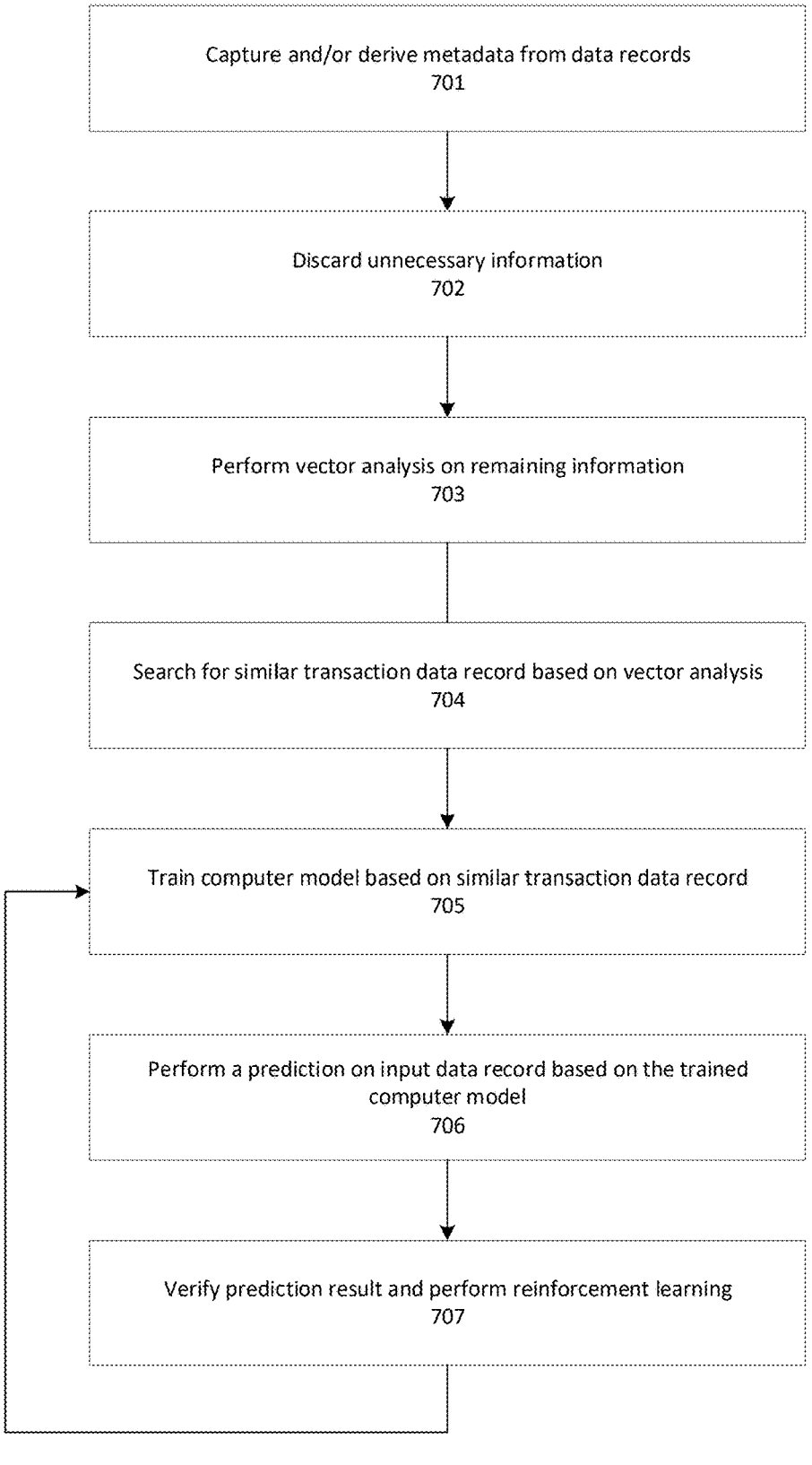
FIG. 7 illustrates a method for generating multiple vectors for an inter-domain event data record and performing a prediction based on the multiple vectors in accordance with an embodiment

FIG. 7 illustrates a method for generating multiple vectors for an inter-domain event data record and performing a prediction based on the multiple vectors in accordance with an embodiment.

Conventional technology for observing inter-domain events may be limited to two levels of validation, one at an upstream component or node, and another one at a downstream component or node. As a result, the conventional observations are limited to two or three vectors of metadata, which may provide a limited insight into the data being observed and resulting inaccurate predictions. Further, performing validations at two separate entities may lead to redundancies and may slow processing of data events.

According to exemplary aspects, present disclosure provides a third party validation mechanism, which reduces the validations steps to one instead of two required conventionally. Moreover, the third party validation mechanism may be provided via the exemplary observer system and method described above. The third party validation mechanism may additionally utilize the metadata or attributes gathered by the observer system for generating additional vectors for a respective data record. For example, certain attributes of a data record may have required dependencies or restrictions according to a prestored rule set, such that multiple attributes may be derived from a single data point. Accordingly, a large number of vectors, greater than two or three that were conventionally, available may be obtained for respective data records.

Further, given the larger number of vectors available, a more accurate analysis may be performed for identifying more similar historical data records for training of machine learning (ML) or artificial intelligence (AI) models. Based on the initial training of such models, received inter-domain event may be processed for providing a prediction. The predicted output may be later tracked and verified for performing reinforcement learning for second training of the respective ML or AI models.

In an example, AI or ML algorithms may be generative, in that the AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, N-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 701, the observer system may capture and/or derive metadata or attributes for corresponding inter-domain events, which may be transmitted via a data stream. According to exemplary aspects, the metadata or attributes may be dynamically captured and/or derived for the streamed data.

In operation 702, information deemed as unnecessary may be either discarded or passed from storage. According to exemplary aspects, minimal amount of metadata may be captured for keeping data records light weight without creating latency to existing processes.

In operation 703, vector analysis may be performed on remaining information. According to exemplary aspects, vector analysis on captured attributes may be performed based on relationship with other attributes based on a dynamically applied ruleset, identified workflow, tracing and the like. For example, a rule set may dictate certain incompatibilities, required attributes, associated attributes and the like for providing of additional attributes or vectors.

In operation 704, based on the vectors identified via the vector analysis, similar historical transactions may be identified. According to exemplary aspects, while a limited number of vectors may invite data records that may not be highly related, a larger number of vectors may identify more closely related data records that may have similar patterns or outcomes.

In operation 705, the ML or AI model may be trained based on the similar historical transactions identified.

In operation 706, the initially trained ML or AI model performs a prediction on new or inputted inter-domain events. According to exemplary aspects, at least since the ML or AI model is trained with historical transactions having similarity with the larger number of vectors than that was conventionally available, predictions performed by such a model may generate a higher accuracy output.

In operation 707, the predicted outputs may be tracked for validations and for performing of reinforcement learning. For example, incorrectly predicted outcomes may be corrected and included in a training dataset for second training of the ML or AI model in operation 705 to further improve the accuracy of the ML or AI model.

FIGS. 8A-D illustrate an observer system dashboard providing a summary of events processed with access to a corresponding report in accordance with an embodiment.

Figure 8A:
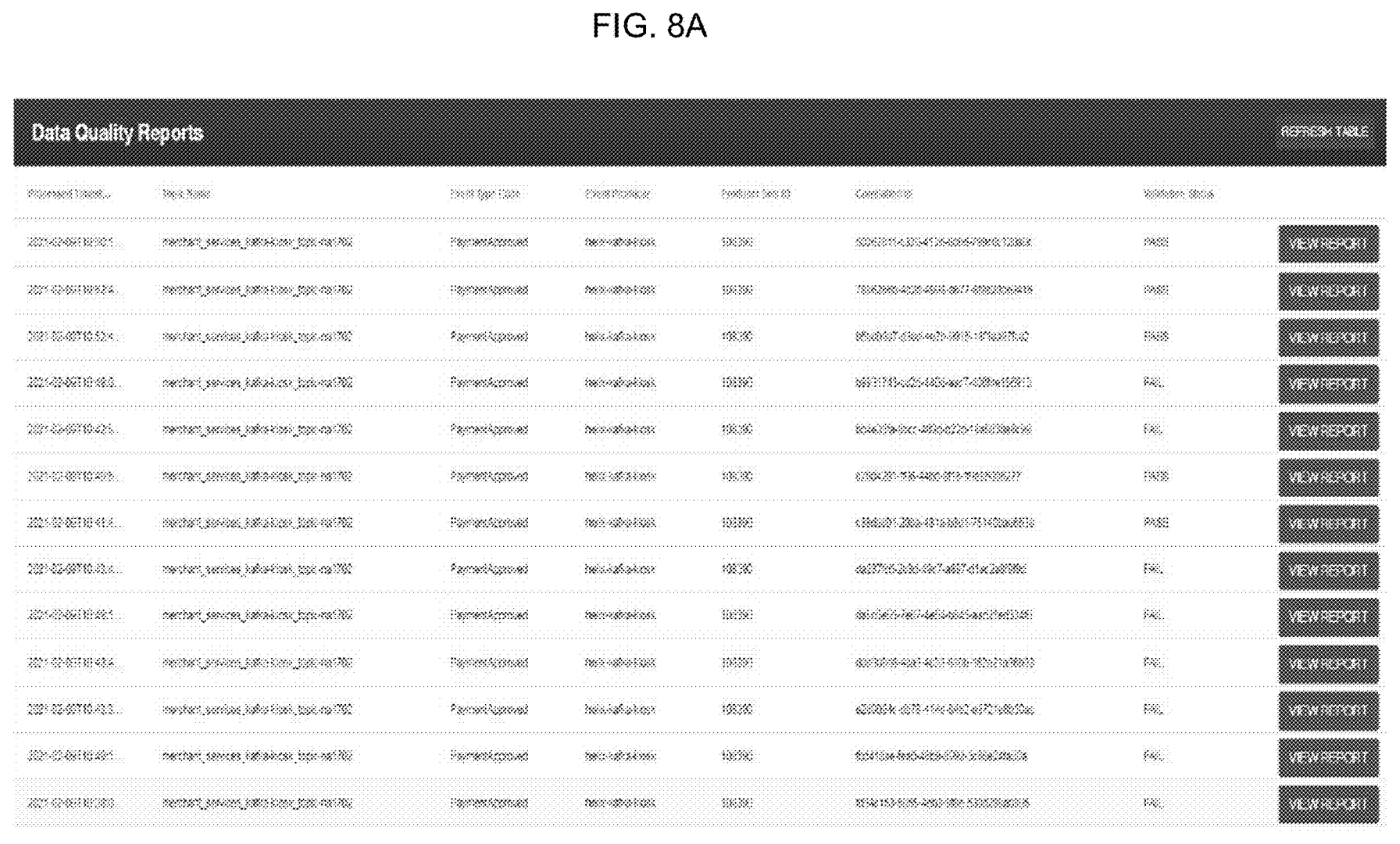

Once the data records or inter-domain events have been captured with metadata, such data records may be available for reporting or to be viewed on a dashboard. FIG. 8A exemplarily illustrates a reporting dashboard. The reporting dashboard of FIG. 8A may provide or display a processed timestamp field, a topic name field, an event type code, an event producer, a producer seal identifier (ID), correlation ID, validation status, and a view report button for generating a report for each of the respective data record. However, aspects of the present disclosure are not limited thereto, such that more or less data fields may be displayed.

Once a user actuates the digital view report button, a corresponding report may be generated as exemplarily illustrated in FIGS. 8B, 8C and 8D. For example, individual data record report may provide a summary of event details. As illustrated in FIG. 8B, the event details may include a topic name, event type, producer application seal ID, producer application module, correlation ID, transaction processing entity identifier, producer published timestamp, observer processed timestamp, transaction ID, subject name, source schema ID, source schema version, template schema and a validation status. However, aspects of the present disclosure are not limited thereto, such that more or less metadata may be captured and/or displayed. According to exemplary aspects, template schema may include a set of message headers. However, aspects of the present disclosure are not limited thereto, such that different information may be utilized for generating the customizable schema templates.

Further, the repot may additionally include information on attribute checks details. According to exemplary aspects, the attribute checks may be performed for data records having one or more error. One or more errors may be expected or unexpected. For example, an error may include a failure to perform an operation in a workload or a rule violation. As illustrated in FIG. 8C and FIG. 8D, attribute checks information may include one or more sets of field name, data type, and quality check failure information. However, aspects of the present disclosure are not limited thereto, such that more/less or different information may be captured and displayed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing dynamic observations of inter-domain event processing in real-time, the method comprising:

receiving, via a processor and at an upstream application, an inter-domain event;

serializing, via the upstream application executed by the processor, the inter-domain event;

transmitting, via the upstream application to an event streaming platform, the serialized inter-domain event as a data stream;

extracting, by the event streaming platform, a topic for the serialized inter-domain event;

transmitting, by the event streaming platform, the serialized inter-domain event;

identifying, via an observer application executed by the processor, a workflow corresponding to the identified topic;

deserializing, via the observer application executed by the processor, the serialized inter-domain event;

applying, via the observer application executed by the processor, an event template corresponding to the deserialized inter-domain event;

based on the applying of the event template and via the observer application executed by the processor, dynamically identifying and applying a corresponding rule set without first requiring storage of the inter-domain event as a data object;

capturing, by the observer application executed by the processor, attributes corresponding to the inter-domain event based on the applied rule set; and storing, in a database, a data record of the inter-domain event with the captured attributes.

2. The method according to claim 1, further comprising:

validating, by the observer application executed by the processor, each operation of the workflow was successfully performed or not.

3. The method according to claim 1, further comprising:

validating, by the observer application executed by the processor, each of the applied rule set for determining whether each rule in the applied rule set was violated or not.

4. The method according to claim 1, wherein the event template is customizable for capturing differing attributes of the inter-domain event without requiring a change to an underlying application.

5. The method according to claim 1, wherein the observer application is configured to centrally perform all validations for the inter-domain event processing.

6. The method according to claim 1, wherein the observer application is a third party to the upstream application and a downstream application that is to consume the data stream transmitted by the upstream application.

7. The method according to claim 1, further comprising:

building, by the event streaming platform, a data pipeline for the serialized inter-domain event; and transmitting, by the event streaming platform and to a downstream application, the serialized inter-domain event for consumption by the downstream application.

8. The method according to claim 7, wherein the event streaming platform contemporaneously transmits the serialized inter-domain event to both the observer application and the downstream application.

9. The method according to claim 1, wherein the event template creates at least one restriction.

10. The method according to claim 1, wherein the event template creates at least one requirement.

11. The method according to claim 1, wherein the event template replaces at least one attribute with another attribute.

12. The method according to claim 1, further comprising:

deriving, by the processor, at least one additional attribute based on the captured attributes.

13. The method according to claim 1, wherein an amount of the attributes captured is minimal to prevent creating data latency.

14. The method according to claim 1, wherein the attributes are captured dynamically based on the applied rule set.

15. The method according to claim 1, wherein at least one attribute is captured based on a violation of the identified workflow.

16. The method according to claim 1, further comprising:

generating, by the processor, a plurality of vectors greater than three based on the captured attributes;

identifying, by the processor, a plurality of historical data records based on the plurality of vectors;

first training, by the processor, a machine learning (ML) model using the plurality of vectors and the plurality of historical data records identified; and applying, by the processor, the first trained ML model on the inter-domain event and generating a prediction of an outcome of the inter-domain event.

17. The method according to claim 16, further comprising:

tracking, by the processor, a result of the inter-domain event;

comparing, by the processor, the result with the predicted outcome;

providing, by the processor, a correction to the result when the result is different from the predicted outcome; and second training, by the processor, the first trained ML model with the correction.

18. The method according to claim 1, further comprising:

generating, by the processor, a report of the data record of the inter-domain event with the captured attributes.

19. A system for performing dynamic observations of inter-domain event processing in real-time, the system comprising:

a processor configured to execute one or more applications; and a memory operatively connected to the processor via a communication interface, the memory storing computer readable instructions, when executed, causes the processor to:

receive, at an upstream application, an inter-domain event;

serialize, via the upstream application, the inter-domain event;

transmit, from the upstream application to an event streaming platform, the serialized inter-domain event as a data stream;

extract, by the event streaming platform, a topic for the serialized inter-domain event;

transmit, by the event streaming platform, the serialized inter-domain event;

identify, at an observer application, a workflow corresponding to the identified topic;

deserialize, at the observer application, the serialized inter-domain event;

apply, via the observer application, an event template corresponding to the deserialized inter-domain event;

based on the event template applied and by the observer application, dynamically identify and apply a corresponding rule set without first requiring storage of the inter-domain event as a data object;

capture, via the observer application, attributes corresponding to the inter-domain event based on the applied rule set; and store, in a database, a data record of the inter-domain event with the captured attributes.

20. A non-transitory computer readable medium configured to store instructions for performing dynamic observations of inter-domain event processing in real-time, the instructions, when executed, cause a processor to perform the following:

receive, at an upstream application, an inter-domain event;

serialize, via the upstream application, the inter-domain event;

transmit, from the upstream application to an event streaming platform, the serialized inter-domain event as a data stream;

extract, by the event streaming platform, a topic for the serialized inter-domain event;

transmit, by the event streaming platform, the serialized inter-domain event;

identify, at an observer application, a workflow corresponding to the identified topic;

deserialize, at the observer application, the serialized inter-domain event;

apply, via the observer application, an event template corresponding to the deserialized inter-domain event;

based on the event template applied and by the observer application, dynamically identify and apply a corresponding rule set without first requiring storage of the inter-domain event as a data object;

capture, via the observer application, attributes corresponding to the inter-domain event based on the applied rule set; and store, in a database, a data record of the inter-domain event with the captured attributes.

* * * * *